United States Patent Office 3,530,534
Patented Sept. 29, 1970

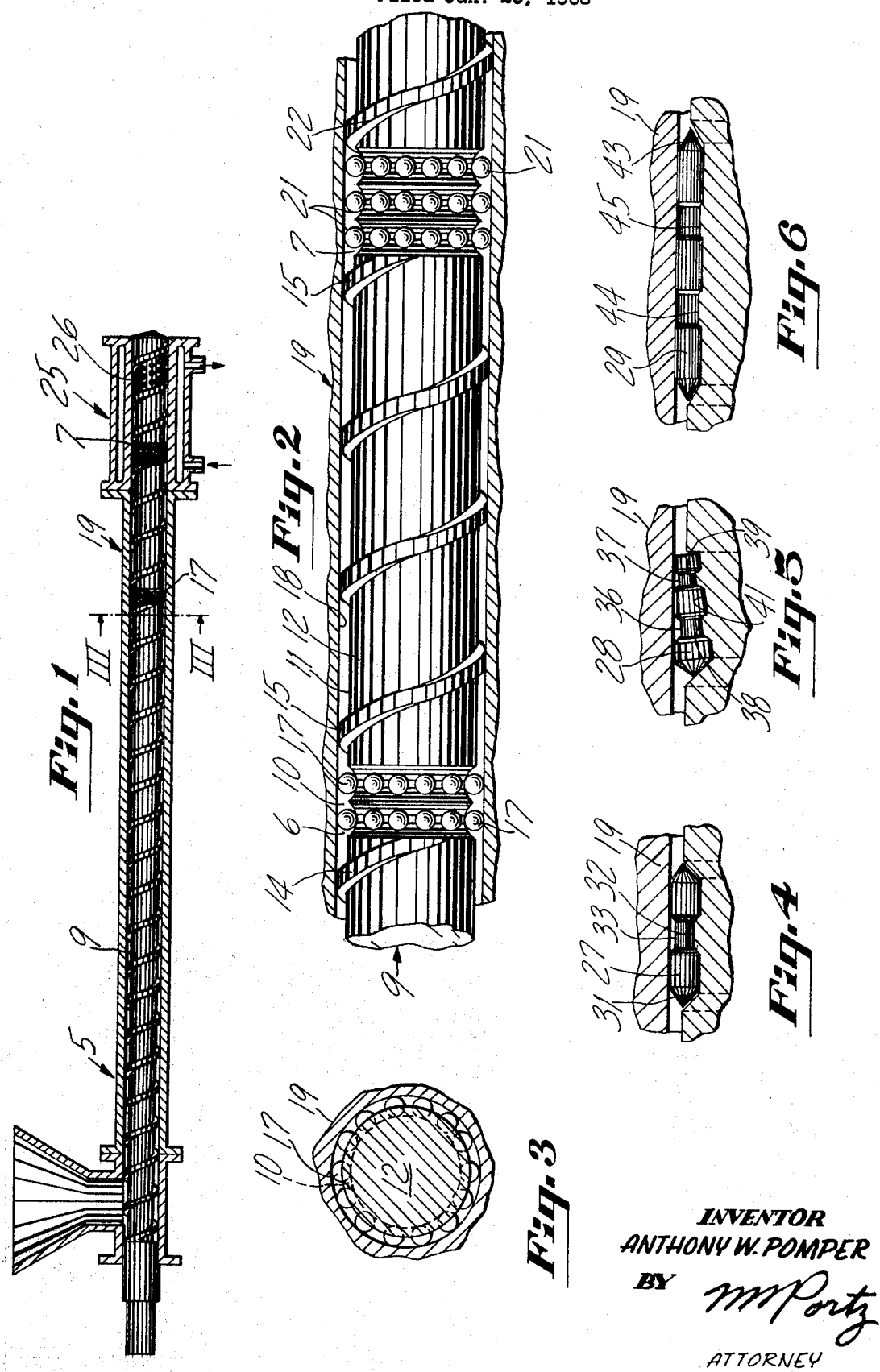

3,530,534
EXTRUDER WITH BALL AND SCREW DISPERSING MECHANISM
Anthony W. Pomper, Edison, N.J., assignor to Midland-Ross Corporation, Cleveland, Ohio, a corporation of Ohio
Filed Jan. 29, 1968, Ser. No. 701,258
Int. Cl. B29f 3/02
U.S. Cl. 18—12                                      4 Claims

ABSTRACT OF THE DISCLOSURE

An auger-type extruder wherein the thread and the core of the screw are shaped to provide an annular path extending radially outward from the bottom of a recess in the core along which rollable elements are confined between the bottom of the recess and the inner surface of the barrel of the extruder.

DESCRIPTION

Two important factors which affect the facility with which thermoplasticized extrudate of an auger-type extruder may be shaped to form articles accurately to a desired contour are (1) uniformity of temperature of the extrudate and (2) degree of dispersion of various components of the extrudate. These factors are significant, for example, in blow-molding wherein a thermoplasticized parison is expanded into conformity with a mold by air pressure or vacuum.

"Mixing" in the sense ordinarily accepted in commercial operation of extruders may be regarded as a rather gross action effecting random scattering of minute portions of the melt in its condition as discharged from the extruder. The melt may be in a thermally uniform state because mixing has been carried out to a degree that any non-uniformity of heating is readily corrected by transfer of heat from small hotter portions of the melt to adjacent cooler portions.

"Dispersing," as intended herein, involves a more microscopic "mixing" in which particles of the various compounds in the melt are uniformly distributed. Carried to an extreme, dispersions may be prepared wherein the particles approach sizes in the order of a few molecules of thickness.

Prior workers in the field of extruder construction have experimented at the periphery of the present invention without using the construction herein disclosed with devices of roller or ball bearing-like construction for the purpose of, e.g., supporting the screw. Such devices include one wherein a tapered roller-bearing structure complete with outer and inner races is supported at an intermediate section of the extruder for the purpose of "kneading" a plastic material.

An important object of this invention is to provide an auger-type extruder of the simplest most economical design believed to be available in the use of rolling bodies within the thread length of the screw. Ancillary to this object is the object of eliminating bearing races, changes in barrel diameter and other expensive construction features and to utilize extruder design incorporating barrels and screws of uniform diameters and standard thread construction.

It is also an object to provide a mode of extruder construction wherein new extruders may be easily constructed or existing extruders may be easily modified to achieve variation as to treatment applied by the extruder to the melt, i.e., to provide a design concept that may be superimposed on a basic standard design of extruder to flexibly construct extruders in a variety of models suitable for extruding different types of plastics in any desired physical condition.

These objects are achieved in an extruder (1) which has a barrel and a screw of which the screw is open in one or more annular regions, each region including an annular recess in the outer surface of the core and corresponding gaps in the thread structure of the screw extending radially outwardly to the inner surface of the barrel; and (2) the extruder comprises a ring of rolling elements of smooth periphery and greater diameter than the radial distance between the inner barrel surface and the outer core surface to entrap the elements between the inner barrel surface and the surfaces forming the core recess.

In preferred embodiments, a single region may include a core recess defined by a plurality of grooves adapting the region to contain a corresponding number of rings or annular rows of rolling elements between, e.g., adjacent ends of screw threads in serial relationship.

Furthermore, an extruder may have two or more regions spaced lengthwise of the extruder axis by the thread structure of the screw with each region containing rows of elements in accordance with a predetermined pattern or procedure of dispersing and controlling the temperature of the plastic material.

In conjunction with the dispersing mechanism just described, auxiliary cooling or heating, and mixing facilities may be included in the extruder as described below.

In the drawing with respect to which the invention is described below:

FIG. 1 is a fragmentary schematic longitudinal view with certain parts in cross section of an extruder in accordance with one embodiment of the invention;

FIG. 2 is an enlarged view of a section of the extruder shown in FIG. 1;

FIG. 3 is a fragmentary transverse cross section of the extruder of FIG. 1 taken along line III—III of FIG. 1;

FIG. 4 is a fragmentary view in longitudinal cross section showing modified mechanism for dispersing components of a plasticized thermoplastic composition;

FIG. 5 illustrates another embodiment dispersing mechanism in fragmentary longitudinal view and cross section of a modified extruder; and FIG. 6 is a fragmentary longitudinal view of still another extruder with a modified dispersing mechanism.

FIGS. 1, 2, and 3 illustrate an extruder 5 which is of standard and conventional construction except for structure found in dispersing regions 6 and 7 contiguous with the regions containing threads 6 and 7. The extruder structure providing these regions is not known to be heretofore disclosed by the prior art and may be embodied in a newly manufactured extruder or a used extruder with portions of the thread and the core of the screw removed and rolling elements added.

As shown, the extruder 5 comprises a screw 9 formed with an annular recess 10 in the outer surface 11 of the core 12 thereof as a portion of a dispersing region 6. The thread structure of the screw is open, i.e., a gap between the threads 14 and 15 is provided in outward radial relationship with the recess 10 to further define the region 6. As this region receives two rows or rings of spherical balls 17, the recess 10 is formed of two juxtaposed parallel grooves in the core of the thread which defines annular guiding surfaces in conjunction with the inner surface 18 of the extruder barrel 19. As shown, the barrel is of uniform internal diameter and the radii of the threads relative to the longitudinal axis barrel are uniform. The balls 17 have a diameter greater than the distance between the inner barrel surface 18 and the outer core surface 11. The extruder is thus constructed to enable the balls to roll along the recess 10 in guiding relation with the side or ridge surfaces of the recess. Preferably, the balls are of sufficient thickness to fit between the barrel and the bottom of respective grooves with a radial tolerance in the order of a few thousandths of an inch disposing the balls approximately within a circle defined by the thread radius to permit assembly of the barrel and the screw with the balls adhered thereto in respective grooves by a thick grease.

Since the extruder 5 is designed for a two-stage dispersing treatment of material passing therethrough, the second state of dispersing is effected in the region 7 wherein the core is shaped to provide a recess comprising three parallel juxtaposed grooves for accommodating the three rings of balls 21 as shown. A gap between threads 15 and 22 renders the region 7 completely open in a circumferential direction. The balls within region 7 occupy this region in a manner described with respect to region 6.

For maximum effectiveness as dispersing mechanism, it is preferred that the potentially thermoplastic material fed in to the extruder be substantially heat-plasticized as it reaches a ball-dispersing region. The material is intensely mechanically worked as it passes through the regions 6 and 7, particularly in passing through three rows of balls in the latter region, and thus is subject to substantial temperature rise. Heating of the work material may be sufficient to reach decomposition temperatures thereof.

If there is a danger of overheating as there will be in the use of dispersing regions containing three to five or more rows of balls, the extruder barrel may be constructed as shown in FIG. 1 wherein a cooling jacket 25 surrounds that section of the barrel 19 down stream from region 7. In this manner, the temperature of material passing down stream from the region 7 may be controlled to a desired level by circulating a coolant between the jacket wall and the barrel.

Such control may be enhanced by use of a screw equipped with mixing pegs 26 secrewed into or otherwise anchored to the screw core 12. Such pegs are disclosed in application Ser. No. 649,733 by co-workers, Barr and Chung. The pegs 26 contribute to faster cooling within the jacketed barrel section as the result of greater mixing and hence, causing greater transfer of heat from the plastic material to the cooled inner surface of the barrel. The pegs also enable the use of a relatively short jacketed section for preparing the now satisfactorily dispersed melt for passage into an extrusion die (not shown) by vigorously mixing the melt to effect temperature uniformity. Such jacketed sections may be interposed at any portion of the length of the extruder and will be especially useful in instances wherein substantially more rows of balls are employed in a single region than the three rows of balls shown at region 7. Because of limited barrel length, pegs similar to pegs 26 may be required in order to achieve an effective temperature control from section to section within the barrel.

Illustrated in FIGS. 4, 5, and 6 are various types of non-spherical roller elements of smooth periphery which may be substituted under special conditions for the spherical elements, i.e., the balls 17 and 21. As elements 27, 28, and 29 of FIGS. 4 to 6 respectively are of elongate roller configuration, the problem of retaining the elements within the respective circumferential recesses of the screw core without jamming makes necessary the provision of some means to maintain the lengths of the roller elements parallel to the screw axis. In FIG. 4, the recess 31 provided for a ring of elements 27 is formed with an annular ridge 32 which extends the full circumference of the recess 31. The roller 27 has an annular groove 33 about its axis which is complementary in its concavity to the convexity of the ridge. A somewhat complex kneading action action occurs as the material moves lengthwise of the barrel 19 past the larger diameter portions and the thinner middle neck portion of the roller 27, i.e., through a region of the recess 31 constricted by the ridge 32.

FIG. 5 depicts a tapered roller having two grooves 36 and 37 cooperating with ridges 38 and 39, respectively, to maintain the rollers in the proper alignment within the screw core recess 41. FIG. 6 illustrates still another variation wherein a cylindrical, elongate element 29 is retained within a recess 43 in proper alignment by ridges 44 and 45, i.e., with the axis of element 29 and other similar elements filling the recess 43 in proximate parallel relation with the longitudinal axis of the extruder.

The present invention is considered an advance in extruder art because of its utilization of rows of rolling elements disposed, e.g., in on or more annular dispersing regions, of which each may in turn be divideed into a plurality of rows of rolling elements, are utilized to accomplish dispersion effects in any magnitude desired. In achieving this result, such special structure as bearing races, special barrel construction, screw of non-standard and irregular construction are avoided. Through the use of auxiliary cooling mechanism, such as the barrel jacket shown, and mixing aids such as the pegs carried by the screw as disclosed herein, extruders of standard lengths have become more effective in achieving more perfectly dispersed meats and, hence, easier-to-process extruder products. Parison and other plastic extruder products are thus easier to form into more accurately-shaped molded articles.

What is claimed is:

1. An auger-type extruder comprising:
   a barrel having a smooth cylindrical inner surface of uniform diameter in concentric relation with a longitudinal axis, a screw supported concentrically in said barrel, the screw having a core and a helical thread extending at uniform radius with respect to said axis around the core in fixed relation therewith at close clearance with said inner surface;
   said screw having an annular open region disposed in contiguous material-receiving relation with a region containing said thread concentric to said axis including an annular recess in the outer surface of said core adjacent an end of said thread; and
   a plurality of rolling elements of smooth periphery received in said region, said elements having circular peripheries disposed approximately within a circle defined by said thread radius adapting them to roll around the core in contact with radially extending or side surfaces of the recess, said peripheries being of a diameter greater than the radial distance between said outer core surface and said inner barrel surface to cause entrapment of the elements by the core and the barrel in said recess and to permit the transfer of the rollers into and out of the barrel while confined by the sides of the recess and end surfaces of said thread.

2. The extruder of claim 1 comprising:
   a second thread in longitudinally spaced relation with the first-named thread;
   said recess disposed between adjacent ends of both threads.

3. The extruder of claim 1 wherein:
   said recess comprises a plurality of parallel grooves juxtaposed; and
   said elements are spheres disposed in each groove, said spheres of each groove being of a diameter sufficient to entrap them within their respective groove between the bottom thereof and said inner surface.

4. The extruder of claim 1 wherein:
   said screw comprises at least three helical threads in longitudinally serial relationship, said threads being spaced from each other by said annular recess and corresponding one or more additional similar recesses, each of said recesses being occupied by a plurality of said rolling elements to provide a plurality of dispersing regions spaced lengthwise of the barrel.

References Cited

UNITED STATES PATENTS

| | | |
|---|---|---|
| 2,754,542 | 7/1956 | Henning et al. |
| 2,785,438 | 3/1957 | Willert. |
| 3,043,480 | 7/1962 | Wittrock. |
| 3,149,377 | 9/1964 | Morse. |
| 3,209,408 | 10/1965 | Kelly. |
| 3,335,461 | 8/1967 | Schwartz. |

FOREIGN PATENTS

| | | |
|---|---|---|
| 1,177,808 | 9/1964 | Germany. |
| 1,053,728 | 1/1967 | Great Britain. |

J. SPENCER OVERHOLSER, Primary Examiner

M. O. SUTTON, Assistant Examiner

U.S. Cl. X.R.

18—30